June 1, 1926.
W. E. WINE
1,586,932
TRACTOR WHEEL
Filed June 22, 1925   2 Sheets-Sheet 1
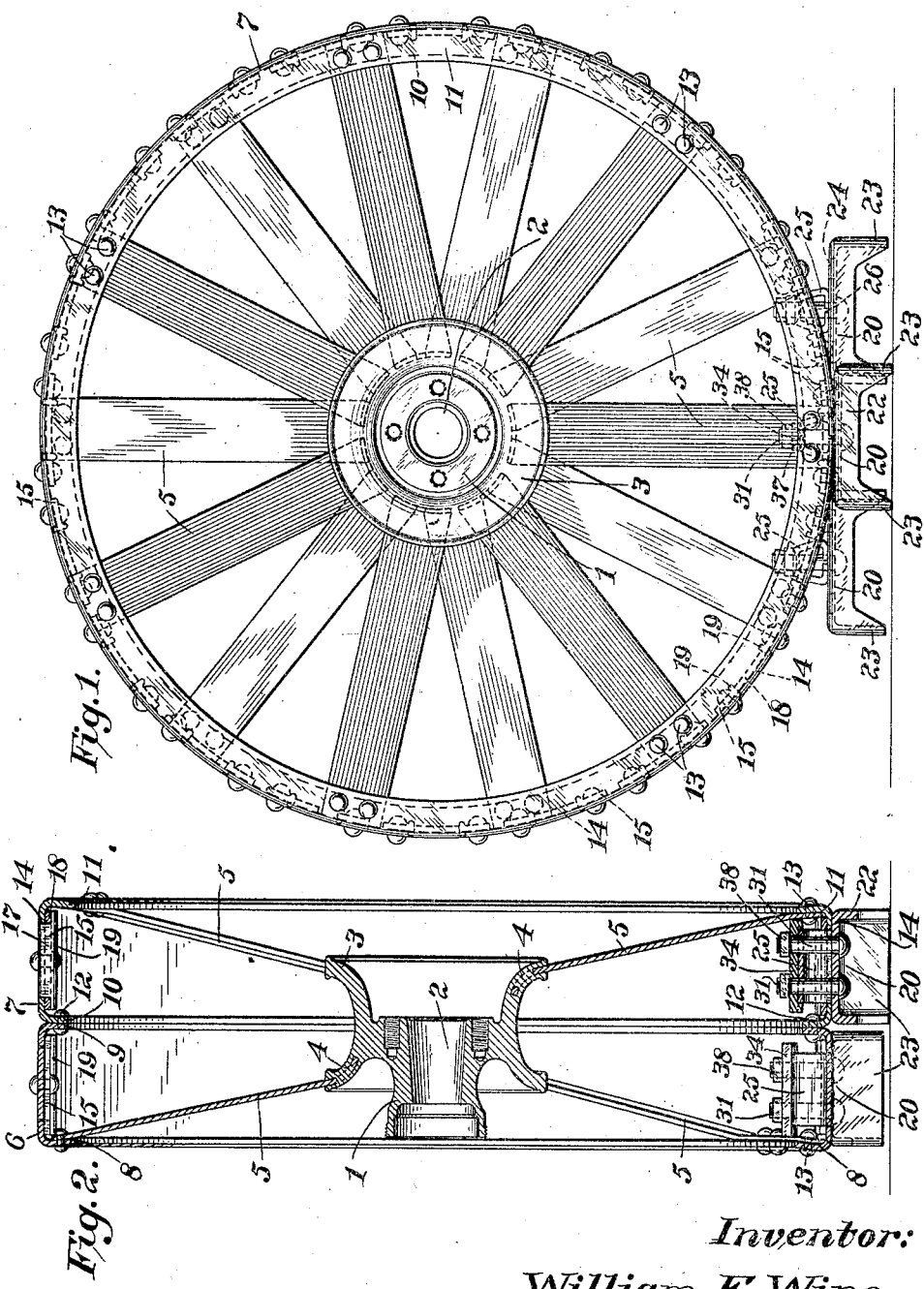
Inventor:
William E. Wine,
by Parker Cook
Atty.

June 1, 1926.                                                                 1,586,932
W. E. WINE
TRACTOR WHEEL
Filed June 22, 1925            2 Sheets-Sheet 2
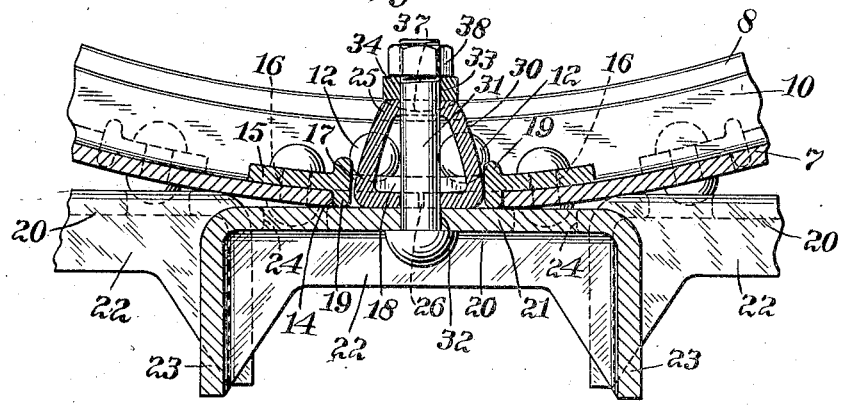
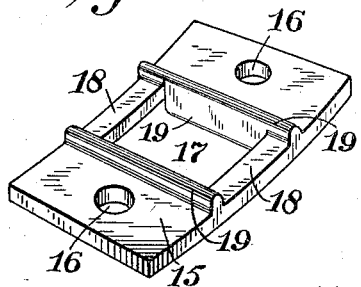
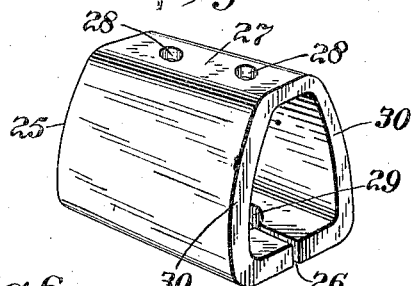
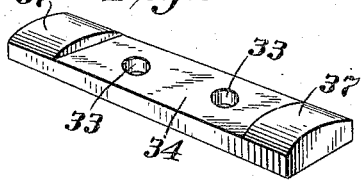
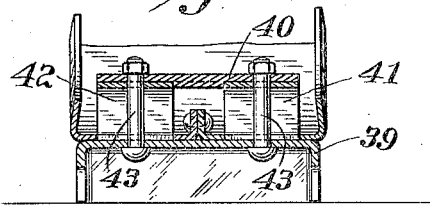
Inventor:
William E. Wine,
by Parker Cook
Atty.

Patented June 1, 1926.

1,586,932

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR WHEEL.

Application filed June 22, 1925. Serial No. 38,678.

My invention relates to new and useful improvements in tractor wheels, and has for an object to provide a wheel which is relatively light though strong in construction and very efficient in service.

Most of the tractor wheels in use today have a metal rim, a metal hub and metal spokes, the rim of the wheel, however, being the width of the wheel and consequently this metal rim is apt to bulge or dent at its center as the spokes extend from the hub to the outer opposite flanges of the rim.

Another object of the invention is to so construct the wheel that metal shoes may be quickly and readily applied to the wheel to provide the desired traction, these shoes being relatively light in weight, efficient in service and readily renewed when necessary.

Still another object of the invention is to provide an extremely strong wheel and to provide the tread members and their fastening means out of pressed metal so that the cost of the several parts will be relatively low.

The shoes in their broadest aspect are somewhat similar to the various types of shoes and fastening means shown in my several co-pending applications of recent date, such as those bearing Serial Numbers 24,461; 26,697; and 23,335 and forms the subject matter of a divisional application filed by me on December 22, 1925, bearing Serial Number 77,059.

With the above and other objects in view, the invention consists in certain new and novel arrangements and combination of parts as will be hereinafter more fully described and pointed out in the claims.

In the drawings showing a preferred embodiment and a modified form,

Fig. 1 is a side elevation of my improved tractor wheel, several of the shoes only being shown.

Fig. 2 is a vertical sectional view showing the formation of the wheel and two of the shoes in staggered relation.

Fig. 3 is an enlarged detailed sectional view showing the shoe and its mode of application.

Fig. 4 is a perspective of a small housing which is secured about the inner periphery of the wheel.

Fig. 5 is a perspective of the retaining means.

Fig. 6 is a perspective of the locking bar of the retaining means, and

Fig. 7 is a detailed sectional view of a slightly modified form of tractor shoe and its mode of application to the wheel.

Referring now to Figs. 1 to 6 inclusive, and with particular reference to Figs. 1 and 2, there is shown a metal hub 1 having the usual central opening 2 through which will extend an axle, not shown. The hub is provided with the peripheral concaved rims or arms 3 which are likewise provided with the small openings 4, the openings following the convexity of the flanges 3 while in these openings are forced the inner ends of the metal spokes 5 as may be readily understood from Fig. 2 of the drawings. To form the rim of the wheel, I provide two circular bands 6 and 7 which are respectively provided with the flanges 8 and 9, and 10 and 11, the adjacent flanges 9 and 10 being securely riveted as at 12 throughout their periphery. The formation of the rim in this manner greatly strengthens the rim as a whole and especially at the center as the riveting of the two flanges 9 and 10 form substantially a peripheral rib, thus preventing any denting or sinking of the rim about a center peripheral line. This is an advantage greatly desired in tractor wheels, as where the spokes extend to the inner and outer edges of the wheel, or to inner and outer flanges at the opposite sides of the rim, the weakest part of the rim is at its center.

Continuing, the spokes 5 are alternately secured at their outer ends to the flanges 8 and 11, as may be seen in Fig. 2, rivets 13 being provided, preferably two to each spoke. It will be understood that the number of spokes might be lessened or might be enlarged, but I have found that the fourteen spokes shown provide the necessary strength combined with the lightness desired in the wheel.

As far as the specification has proceeded, it will be seen that I have provided a tractor wheel which is relatively light, and at the same time relatively strong and greatly strengthened centrally of the rim.

To provide the necessary traction means for this wheel, I cut or stamp a plurality of openings in the rim of the wheel, such as at 14, and about these openings I provide in each instance, a small housing or casing 15 in the form of a plate which is clearly illustrated in Fig. 4, this plate being slightly bent to agree with the arc of the rim and of sufficient width to extend snugly between the flanges 10 and 11 in the one band or between 8 and 9 of the other band. These casings 15 are provided with the holes 16 at their opposite ends for the reception of the rivets, as may be seen in Figs. 1, 2 and 3, while centrally of this housing 15 is the opening 17, the side walls 18 and the small lugs or teeth 19, forming the opposite walls of the openings, these lugs being slightly rounded at their extremities. These lugs extend both above and below the surface of the housing 15 and completely across the same.

It will be understood that these housings 15 will be riveted about the inner periphery of the wheel, thus also strengthening the wheel as a whole and acting as a wearplate for the retaining means of the tread member shortly to be described.

The tractor shoes that may be readily applied to this form of wheel are shown in each of the several views and comprise a tread member 20 which is preferably a steel plate shaped on a large press, say a hundred ton press, each tread member having the inner surface 21 and the outwardly extending flanges 22 which merge with the end walls 23 to form spaced teeth or prongs which are adapted to press into the ground or surface over which the wheel is travelling. These tread members are similar in their broadest aspects to the several forms shown in my copending applications and the tread member per se forms no part of the present invention.

Openings 24 are formed in the inner surface 21 so that the rivet heads may lie within these openings and the rim of the wheel lie flush with the inner surface 21 of the shoe when each shoe is in the position as shown in Fig. 3.

Referring now briefly to the tractor shoes as they form the subject matter of a divisional application, a retaining means 25 in the form of a flat plate is bent to form a tooth with the bottom edges lying adjacent as at 26, while the apex is flattened as at 27 and provided with bolt holes 28, and further bolt holes 29 are formed on the bottom of the tooth. The side walls 30 are curved to provide the tooth action and cooperate with the walls of the bearing 17. Bolts 31 are passed through the opening 32 in the tread member and also pass through holes 33 formed in a locking bar 34 which bar is shown in its inverted position in Fig. 6. The undersurface of the ends of the bar are rounded as at 37 and, after the retaining means is passed through the opening 17 of the housing, nuts 38 will be used on the bolts to hold the parts in their position and hold the shoes with relation to the wheel rim.

As has heretofore been mentioned, the preferred type of wheel is one wherein the openings about the rim are staggered so that the shoes may be applied in staggered relation and it is important that shoes be used like those shown, or a similar type, so that the greatest amount of traction effort may be obtained, and it is also important that the staggered shoes appear in such relationship or position that their ends are substantially opposite each other or slightly overlapped.

As may be seen in Fig. 1 wherein the shoes are shown as having their ends overlapping, it will be appreciated that the end walls 23 which form the spaced teeth or prongs, will bite into the ground in each instance at points substantially the length of the separate shoes.

In other words, if these shoes do not quite overlap, the space between the adjacent ends of the several teeth is so small that it does not offer any resistance to the teeth as the tractor moves and the ground is simply cut up between the teeth. In the same manner, if the shoes overlap each other for too great a distance, a great amount of traction effort is lost, but where the shoes having these teeth are substantially in alignment or slightly overlapped, a large area of ground is presented between the respective ends of the shoes to thereby present the best resistance for the shoes. I preferably arrange the shoes in staggered relation with each other and in this manner they will slightly overlap as may be seen in Fig. 1.

The modified form of tractor wheel and shoe, as shown in Fig. 7 is similar in its broadest aspect to the preferred form, but in this instance, the tread member 39 is substantially twice the width of the former tread member, while the locking bar 40 bridges the two retaining members 41 and 42 and is held by the bolts 43. In this instance there will only be one hole in the inner surface and one hole in the outer surface of each retaining means, rather than two. The location of these shoes about the rim of the wheel will be proportional, space being left between each tread member for its proper rocking as it functions about the rim of the wheel.

From the foregoing it will be seen that I have provided an extremely strong and reinforced tractor wheel, and by forming the rim of two bands, the same is strengthened at its otherwise weakest point. Furthermore, I can use a plurality of tread members on each of the two bands due to the arrangement of the flanges 9 and 10 and due to the fact that the wheel will not buckle or bend centrally of its rim.

Furthermore, if desired, I can use shoes which extend completely across the rim of the wheel as just described and illustrated in Fig. 7.

Although I have shown how one form of tractor shoe may be applied to a wheel of this nature, it will be understood that many other forms of shoes might be equally as well applied, as the housing plates about the apertures in the rim not only strengthen the wheel throughout, but reinforce the openings and are adapted to cooperate with different forms of retaining means.

Also if other forms of tractor shoes are used, it is important, however, that the ends of the shoes are substantially in alignment or slightly overlap, so that the greatest amount of area is obtained between the prongs or teeth of the shoes to thereby make it possible to obtain the greatest traction effort.

Lastly, the wear will fall mostly on the casing or housing 15 rather than on the several bands which make up the rim of the wheel so that the life of the device as a whole is relatively long.

It will be understood that many slight changes may be made in the construction and formation of the tractor shoe or the wheel, without in any way departing from the spirit and scope of the invention.

Having thus described the same, what I claim as new and desire to secure by Letters Patent is:

1. A tractor wheel comprising a hub, spokes and rim, said rim formed of two annular bands provided with side flanges, the adjacent flanges being fastened to each other to thereby form a central peripheral rib, said rim having apertures formed therein and plates secured to the inner surface of the rim, each of said plates provided with openings registering with its aperture in the rim, said plates reinforcing the rim as a whole and also reinforcing the apertures within the rim.

2. A tractor wheel comprising a hub, spokes and rim, said rim comprising two annular bands provided with side flanges, the adjacent flanges being riveted to each other to thereby form a central peripheral rib, the spokes secured to the outer flanges of said rim, each of said bands provided with a plurality of apertures and the apertures in one band staggered with relation to the apertures in the other band, reinforcing plates secured within the rim and provided with openings registering with the apertures within the bands.

3. A tractor wheel comprising a hub, spokes and rim, the said rim comprising two circular bands having inwardly extending flanges at their sides and the adjacent flanges riveted to each other to form a central peripheral rib, the said spokes alternately secured to the outer flanges, said rim provided with a plurality of openings about the same, a plurality of plates each provided with an opening and respectively secured to the inner surface of the rim and about each of said respective openings in said rim.

4. A tractor wheel comprising a hub, spokes and rim, said rim provided with two circular bands having inwardly extending flanges at their sides, the adjacent flanges riveted to each other to form a central peripheral rib, the said spokes secured to the outer flanges of the rim and to the hub, said rim provided with a plurality of openings about its surface and the openings being in staggered relation to each other, a plate secured about each of said openings and to the inner surface of the rim, each of said plates having means thereon extending within the walls of its opening in the rim to thereby strengthen the same.

In testimony whereof I affix my signature.

WILLIAM E. WINE.